(12) United States Patent
Marc et al.

(10) Patent No.: US 12,135,056 B2
(45) Date of Patent: Nov. 5, 2024

(54) SCREW-FIXING DEVICE, WITH LOCKING IN THE SCREWED STATE

(71) Applicant: JPB Système, Montereau sur le Jard (FR)

(72) Inventors: Damien Marc, Blandy les Tours (FR); Denis Messager, Melun (FR); Laure Le Bellu, Villeparisis (FR)

(73) Assignee: JPB Système (FR)

(*) Notice: Subject to any disclaimer, the term of this patent is extended or adjusted under 35 U.S.C. 154(b) by 555 days.

(21) Appl. No.: 17/616,896

(22) PCT Filed: Jun. 10, 2020

(86) PCT No.: PCT/EP2020/066119
§ 371 (c)(1),
(2) Date: Dec. 6, 2021

(87) PCT Pub. No.: WO2020/249629
PCT Pub. Date: Dec. 17, 2020

(65) Prior Publication Data
US 2022/0349438 A1    Nov. 3, 2022

(30) Foreign Application Priority Data
Jun. 13, 2019  (FR) ...................................... 1906293

(51) Int. Cl.
*F16B 39/284* (2006.01)
(52) U.S. Cl.
CPC .................... *F16B 39/284* (2013.01)
(58) Field of Classification Search
CPC ........ F16B 21/18; F16B 21/183; F16B 39/08; F16B 39/10; F16B 39/12; F16B 39/126; F16B 39/284; F16B 39/32

USPC .......................................... 411/204, 205–207
See application file for complete search history.

(56) References Cited

U.S. PATENT DOCUMENTS

| 679,618   | A | * | 7/1901  | Hanson ................... | F16B 39/12 |
|           |   |   |         |                            | 411/243    |
| 1,190,360 | A | * | 7/1916  | Ziplinsky ................ | F16B 39/32 |
|           |   |   |         |                            | 411/272    |
| 1,202,096 | A |   | 10/1916 | Poling                     |            |
| 1,253,958 | A | * | 1/1918  | Godwin et al. .........    | F16B 39/32 |
|           |   |   |         |                            | 411/294    |

(Continued)

FOREIGN PATENT DOCUMENTS

| CN | 105485129 A | 4/2016 |
| DE | 3320679 A1  | 12/1984 |

(Continued)

OTHER PUBLICATIONS

European Patent Office; Search Report in related International Patent Application No. PCT/EP2020/066119 dated Sep. 22, 2020; 2 pages.

(Continued)

*Primary Examiner* — Roberta S Delisle
(74) *Attorney, Agent, or Firm* — Dorton & Willis, LLP

(57) ABSTRACT

A nut includes locking jaws, a floating end of which is actuated by cam profiles inside a rotary actuation ring. The jaws are produced by removing material from the body of the nut, and shift from a locking state to a release state and vice versa by elastic bending deformation. A locking surface on the inside of the jaws has the same thread as the body of the nut.

27 Claims, 7 Drawing Sheets

(56) References Cited

U.S. PATENT DOCUMENTS

| | | | | |
|---|---|---|---|---|
| 1,281,171 | A * | 10/1918 | Kincaid | F16B 39/12 411/223 |
| 1,281,709 | A * | 10/1918 | Thomassen | F16B 39/12 411/222 |
| 1,363,452 | A * | 12/1920 | Bricker | F16B 39/04 411/340 |
| 2,376,768 | A * | 5/1945 | Glumer | F16B 39/32 411/941 |
| 5,702,217 | A * | 12/1997 | Charbonnel | F16B 39/126 411/277 |
| 6,036,236 | A | 3/2000 | Bensel | |
| 2015/0292544 | A1 * | 10/2015 | Rousseau | F01D 5/066 411/204 |
| 2016/0229226 | A1 | 8/2016 | Miller | |
| 2019/0048918 | A1 | 2/2019 | Rode | |
| 2019/0120279 | A1 | 4/2019 | Wiltgen et al. | |
| 2020/0282468 | A1 | 9/2020 | Heckel et al. | |
| 2021/0222726 | A1 * | 7/2021 | Lin | F16B 39/122 |
| 2022/0243758 | A1 * | 8/2022 | Suzuki | F16B 41/002 |

FOREIGN PATENT DOCUMENTS

| | | |
|---|---|---|
| DE | 3935753 A1 | 5/1990 |
| DE | 202013006947 U1 | 8/2013 |
| DE | 102017213047 A1 | 1/2019 |
| FR | 484016 A | 8/1917 |
| GB | 332463 A | 7/1930 |
| JP | H06501092 A | 1/1994 |
| JP | H11247824 A | 9/1999 |
| JP | 3394208 B2 | 4/2003 |
| KR | 101874773 B1 | 7/2018 |
| WO | 2009001421 A1 | 12/2008 |

OTHER PUBLICATIONS

French Patent Office; Search Report in related French Patent Application No. 1906293 dated Feb. 6, 2020; 2 pages.

Indian Patent Office; Office Action in related Indian Patent Application No. 202127056612 dated Apr. 29, 2022; 6 pages.

Chinese Patent Office; Office Action and Search Report in related Chinese Patent Application No. 202080042752.8 dated Nov. 30, 2022; 9 pages.

Japanese Patent Office; Office Action in related Japanese Patent Application No. 2021-573796 dated Jun. 4, 2024; 4 pages.

\* cited by examiner

[Fig. 1]
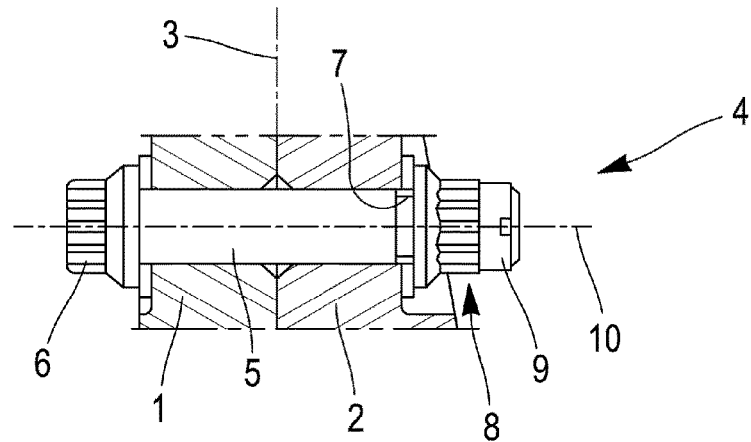
[Fig. 2]
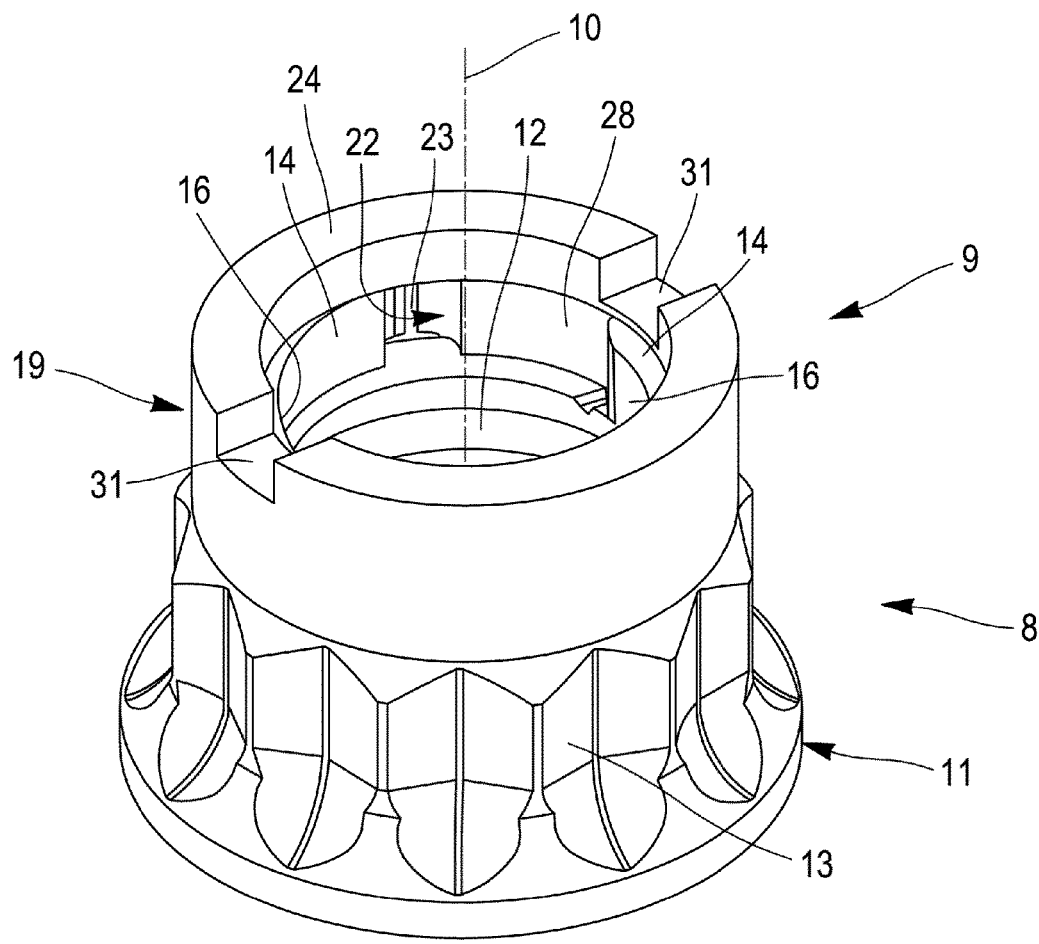

[Fig. 3]
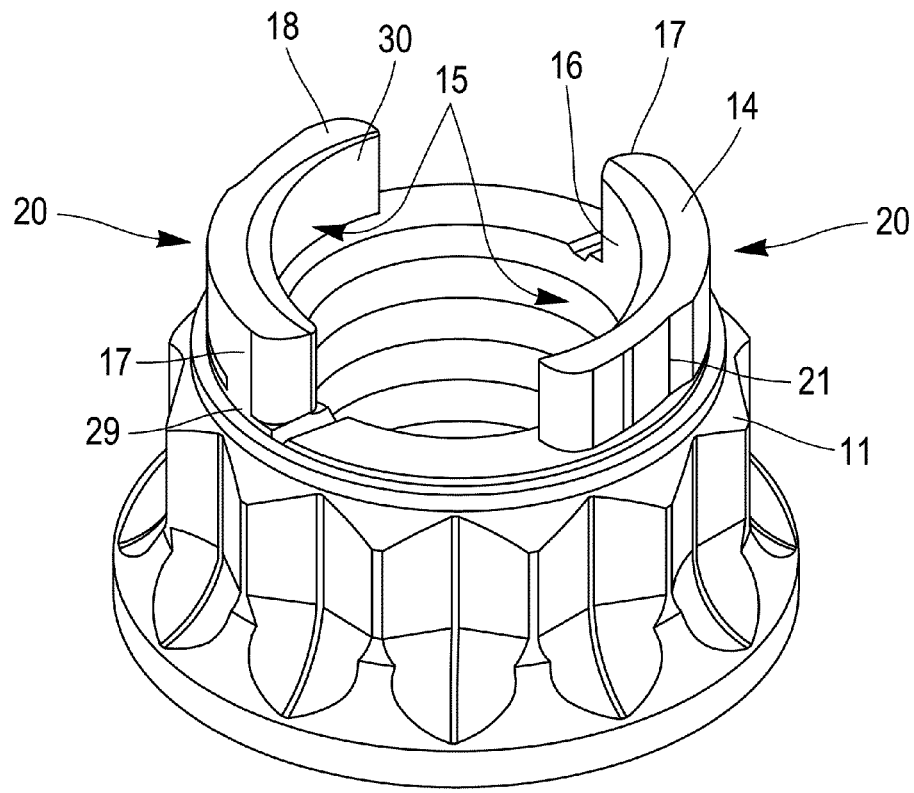
[Fig. 4]
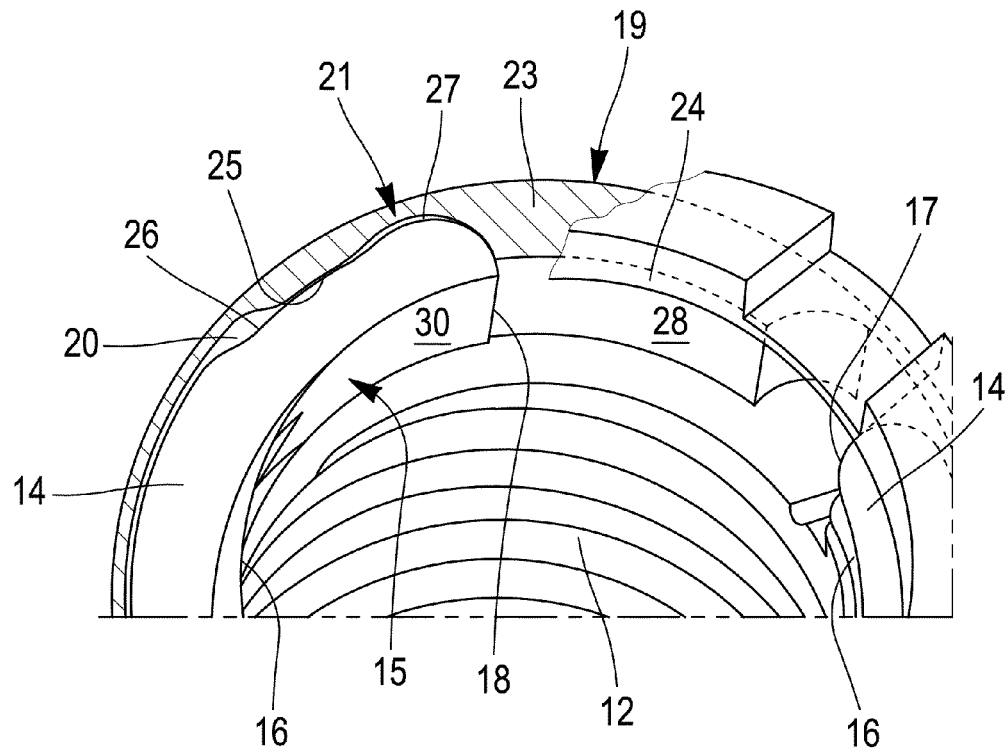

[Fig. 5]
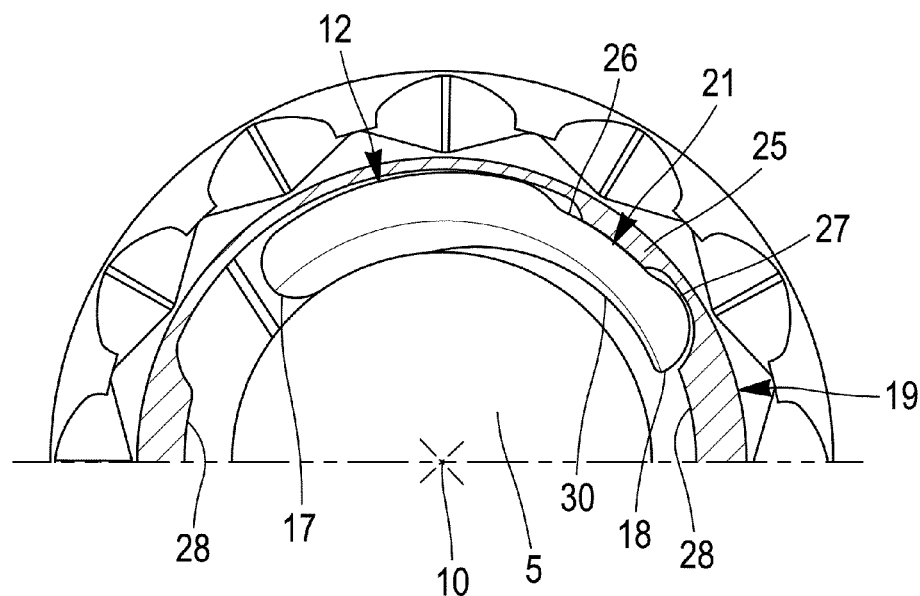
[Fig. 6]
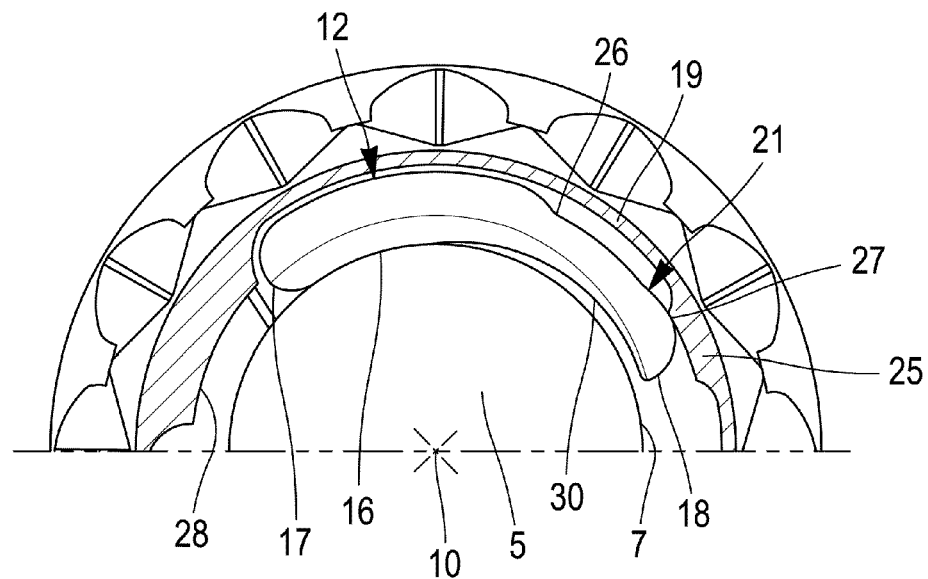

[Fig. 7]
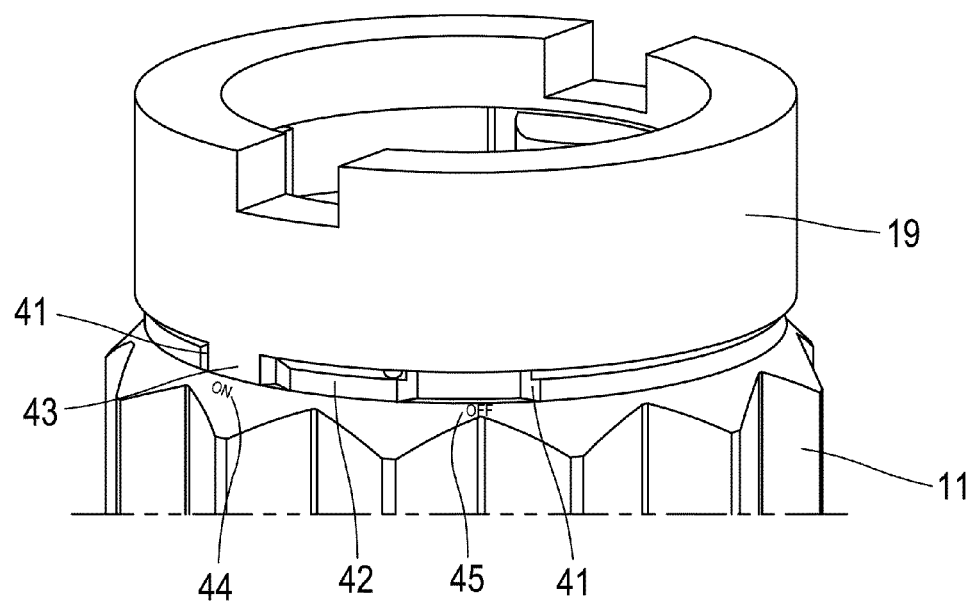
[Fig. 8]
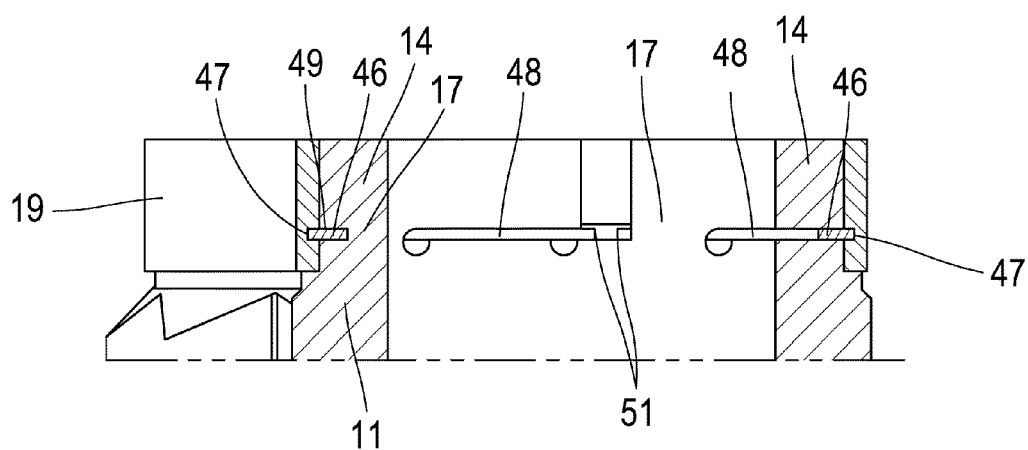

[Fig. 9]
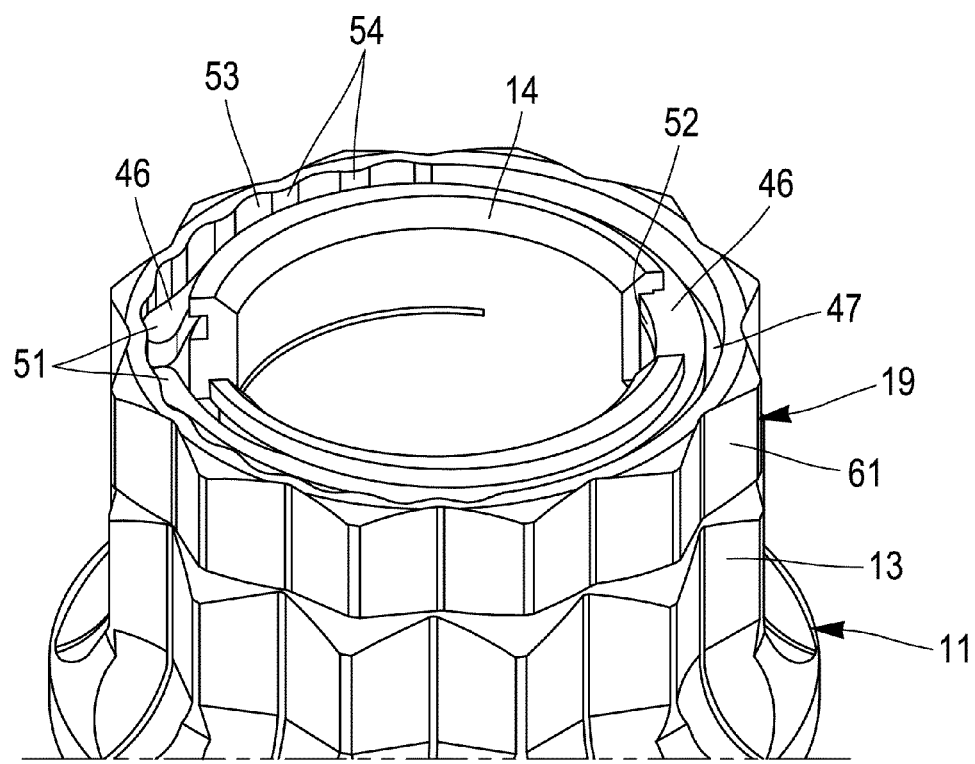

[Fig. 10]
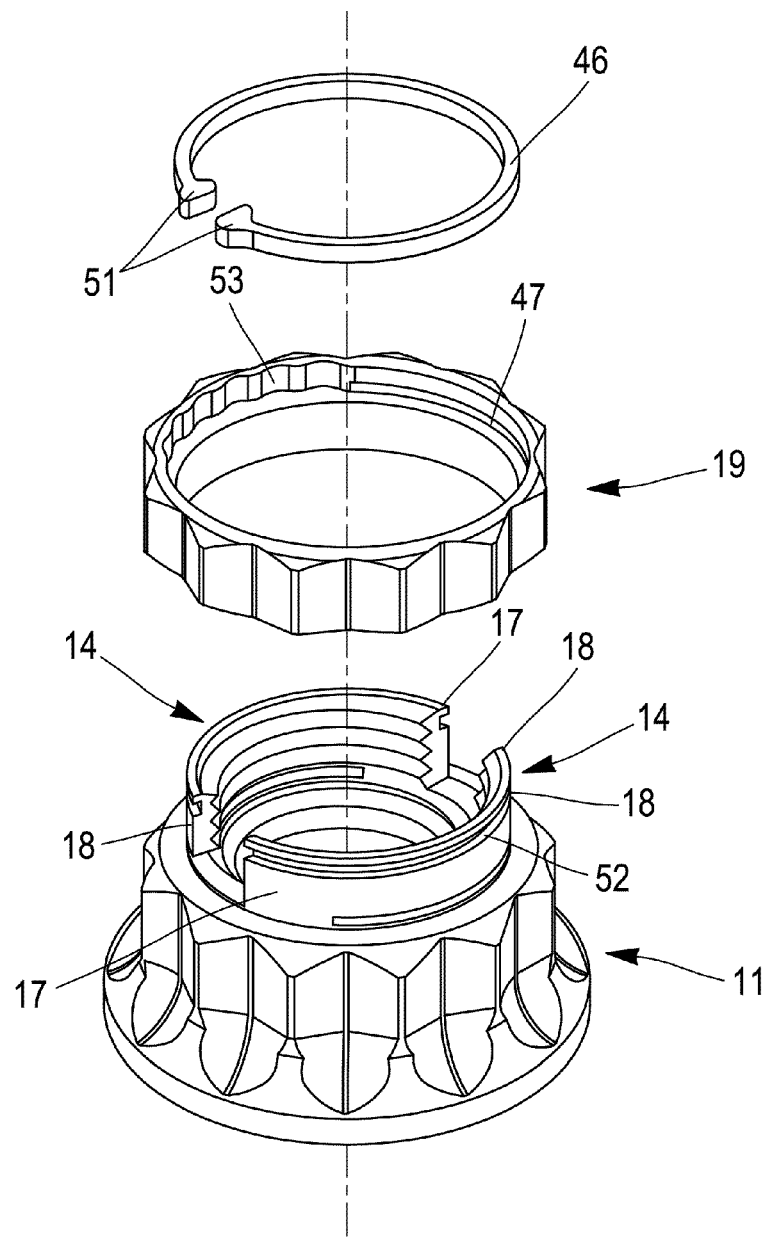

[Fig. 11]
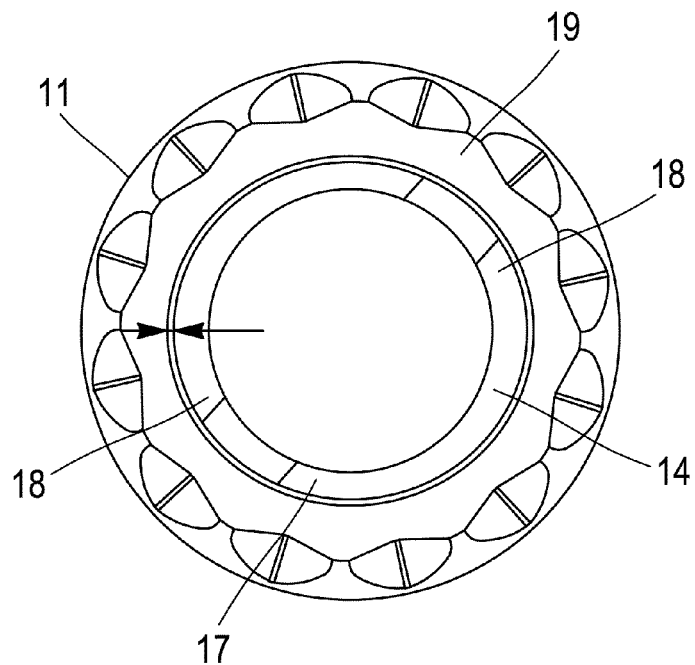
[Fig. 12]
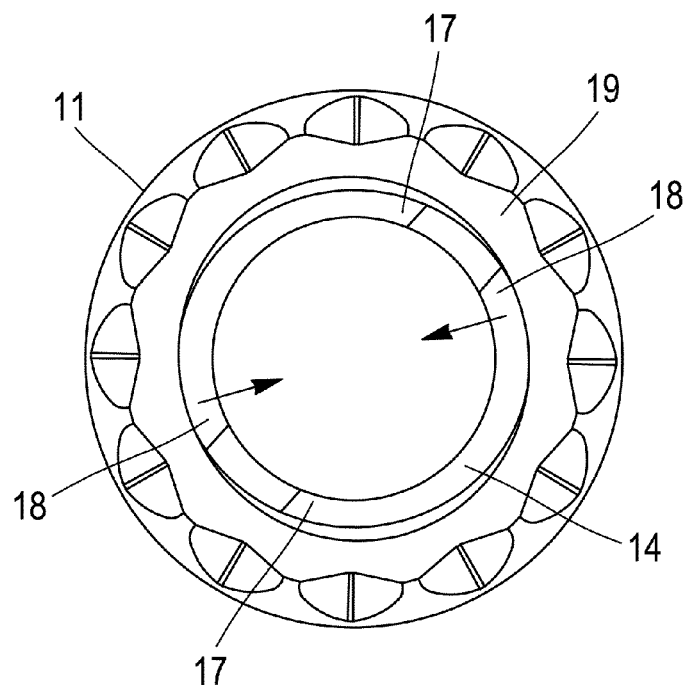

SCREW-FIXING DEVICE, WITH LOCKING IN THE SCREWED STATE

CROSS-REFERENCE TO RELATED APPLICATIONS

This application is a national phase application under 35 U.S.C. § 371 of International Patent Application No. PCT/EP2020/066119, filed Jun. 10, 2020 (pending), which claims the benefit of priority to French Patent Application No. FR 1906293, filed Jun. 13, 2019, the disclosures of which are incorporated by reference herein in their entirety.

TECHNICAL FIELD

The present invention relates to a threaded fastening device including frictional locking means opposing accidental unscrewing under the action, in particular, of mechanical excitations such as vibrations, inertial effects etc.

BACKGROUND

In many of applications, it is advantageous to secure a screwed connection against accidental unscrewing, which is often accompanied by significant risks. This is particularly the case in aeronautics, and specifically with respect to the bolts that assemble the two wheel halves of each wheel of the landing gear, between which the tyre is enclosed.

Threaded fastening devices equipped with locking systems of the latching type only allowing locking in discrete angular positions are known, in particular according to DE 39 35 753 A1, US 2019/00 48 918 A1, U.S. Pat. No. 6,036,236 and WO 2009/001 421 A1. In certain applications where a specific tightening torque must be respected, these locking systems are not suitable because the relative angular position corresponding to the recommended torque does not necessarily correspond to one of the discrete angular positions allowing locking.

Threaded fastening devices equipped with frictional locking means prevent this problem. Nut locking washers which act automatically when the nut reaches the tight state are known. Nuts are also known including locking means in the threaded bore, or nuts which are partially distorted, in particular oval-shaped, to generate friction during the screwing rotation. These known systems rapidly lose efficacy after a small number of locking and unlocking cycles.

CN 105 485 129 A describes a nut axially extended by an internally threaded collar. Axial notches subdivide the collar into several locking jaws capable of deflecting about a substantially tangential axis. A shape memory ring surrounds the collar and grips the latter around the bolt under certain temperature conditions. The ring must exert very significant forces in order to ensure this function.

DE 33 20 679 A1 describes, with reference to FIG. 94, a device which is similar, but in which the locking force is provided by an internally conical bushing, screwed into a separate cup. Numerous additional parts are necessary, the locking operation is fiddly, and it seems that the risk of the bushing coming loose and the loss of the bushing and cup has not been avoided.

DE 10 2017 213 047 A1 provides a female thread that is not in a nut body but in a separate, deformable, bushing. For the locking, a transverse bolt radially urges the deformable bushing. These locking means require a complete redesign of the screwing device, and do not rule out loosening of the transverse bolt.

US 2019/012 0279 A1 describes other devices having a deformable bushing.

US 2016/02 29 226 A1 illustrates a landing gear wheel formed of two wheel halves assembled by bolts. The connection is secured by threads—or wires-passing through transverse piercings of the bolt.

GB 332 463 A describes a threaded fastening device with locking in which a locking jaw configured and positioned to come into abutment against the complementary thread extends in a direction that is substantially circumferential with respect to the locking axis, between an attachment end connected to a body and an end which is floating in a radial direction.

The invention relates to a threaded fastening device with frictional locking in the screwed state, comprising:
- a body having a threaded cylindrical surface intended to threadingly engage a complementary thread;
- at least one jaw connected at least indirectly to the body and having a locking surface on its side turned in use towards the complementary thread, configured and positioned to come into locking abutment against the complementary thread, the at least one jaw extending in a direction that is substantially circumferential with respect to the axis of the cylindrical surface, between an attachment end connected to the body and an end which is floating in a substantially radial direction; and
- an actuation element that can be moved between a locking and a release position, to selectively place the jaw in a locking state in which the locking surface exerts a locking pressure onto the complementary thread, and respectively in a release state of the relative screwing and unscrewing movement.

Such a device is known from DE 20 2013 006 947 U1. The jaw or jaws that are substantially circumferential can have very small overall size axially while being manoeuvrable with a reasonable force and applying an effective locking force to the thread.

SUMMARY

The aim of the present invention is to propose a threaded fastening device ensuring frictional locking in the screwed state which at least partly satisfies the following objectives: ensuring a reliable locking even after several screwing/unscrewing cycles, being simple to use, implementing moderate actuation forces, not requiring a particular design of the screwed connection itself or of the elements to be fastened using this fastening, not requiring components or accessories that risk being lost, not damaging the threads, not requiring modification of the element bearing the complementary thread, and only having a minimum impact on the weight and dimensions of the fastening device.

According to the invention, the fastening device is characterized in that the actuation element is an actuation ring mounted in rotation with respect to the body about the axis of the threaded cylindrical surface. Thus, a simple rotation of the actuation ring makes it possible to put the fastening device in the locking state or conversely in the release state.

In a version, the actuation element is configured to exert on a side of the jaw facing away from the locking surface, a force directed in use towards the complementary thread, the return of the jaw in the release state being carried out by elasticity.

According to an embodiment, the actuation element urges the jaw by bending to pass from the release state to the locking state. The circumferential jaw according to the invention opposes in particular much less resistance to bending than the axial tongues of certain previous documents discussed above.

In an advantageous embodiment, at least in the locking state, the locking surface of the jaw is closer to the attachment end of the jaw than an area of interaction between the jaw and the actuation element, so as to cause the jaw to undergo flexural strain between the locking surface and the interaction area when the jaw is in the locking state. Thus, there is an advantageous lever effect on the jaw which reduces the actuation force required with respect to the urging force desired for locking. Moreover, the area of flexural strain—or bending—between the actuation element and the locking surface serves to limit pressure between the locking surface and the complementary thread. This protects the fastening device.

Preferably, but non-limitatively, the attachment end of the jaw is rigidly connected to the body. In a version, the jaw and the body come from a single piece of material, being connected together at the attachment end of the jaw. Thus, the manufacture is simplified while making the embodiment particularly robust.

In an embodiment, the locking surface of the jaw belongs to the threaded cylindrical surface. Thus, in the locking state, the locking surface perfectly matches the complementary thread.

Preferably, in order to facilitate the maintenance operations and make them more reliable, the actuation element is connected to the body permanently or in a manner forbidding disassembly except with a tool. Thus, the actuation element cannot be lost in use, with respect to the body.

The ring is preferably configured as a protective cover protecting the at least one jaw.

In an embodiment, the ring is held axially with respect to the body by means of a retaining ring. This arrangement is advantageous in terms of overall size. Moreover, access to the retaining ring which would make it possible to disassemble the ring is hidden or impossible, which avoids any intervention, in particular any disassembly, detrimental to the safety expected from the fastening device according to the invention.

For its axial positioning with respect to the body, provision can be made for the retaining ring to be partially housed in a void arranged between the jaw and the rest of the body. This solution is advantageous in terms of machining and space requirement.

In a version, the retaining ring is immobilized against rotations with respect to one of the body and the ring, and includes at least one projection which cooperates with at least one recess provided in the other one of the body and the ring, so as to limit the angular travel of the ring with respect to the body. This solution enables the retaining ring to provide both axial immobilization of the actuation ring and limitation of its travel in rotation. According to an advantageous development of this version, the recess includes at least one boss that the projection can pass by elasticity, as with a hard point. This hard point stabilizes the angular position of the actuation ring with respect to the body in the case of accidental movements caused by the vibrations or other disturbances.

Preferably, the actuation ring and the jaw interact by means of respective conjugate cam profiles. This mode of action facilitates generation of the force required for locking, both in terms of direction and intensity.

In a version, the cam profile of at least one of the actuation ring and the jaw belongs to a respective ellipse centred on the axis of the cylindrical surface.

In another version or the same one, the conjugate profiles define a hard point for the movement of the actuation ring between its locking and release positions.

The utility of such a hard point in the movement of the actuation element has been disclosed above in general terms. The hard point can be made in different ways in addition to those already disclosed.

Quite as generally and non-limitatively, it is advantageous to provide stop means which limit the movement of the actuation element in its displacements, allowing it to occupy respectively, its locking and release positions. Advantageously, these stop means can comprise an overthickness of the actuation element, protruding between two jaw ends. The purpose is here of fundamentally preventing any manipulation error in which an excessive actuation force would drive the actuation element beyond its normal travel.

Still generally and non-limitatively, the device advantageously comprises means indicating the position of the actuation element.

In a version, the device comprises an interlock system which immobilizes the actuation element in each of its positions, of locking and respectively of release, with respect to the body. Here, it is a case of stabilizing the actuation element against unwanted mechanical excitations, to avoid its spontaneous change of position and/or to avoid its oscillation in a concerning manner capable of suggesting a malfunction. In an embodiment, the interlock system comprises a tooth which is displaced between two stops and, between the two stops, a boss that the tooth can pass by elastic deformation. This constitutes another way of producing the hard point the function of which is already discussed above. In each position, locking and respectively release, of the actuation element, the tooth is immobilized between a stop mentioned above and the boss.

Typically, the fastening device is a nut.

In an embodiment, the body includes a tubular wall internally provided with the threaded cylindrical surface, and the at least one jaw is at least partly defined by material removal from said tubular wall.

Preferably, but non-limitatively, the fastening device incorporates, in a single independent assembly, the body with its threaded cylindrical surface, the at least one locking element and the control element. Produced in this way, the device according to the invention is used like a conventional fastening device, save for the need to put the actuation element in the locking position after screwing, or in the release position before unscrewing. No complex manipulation is necessary, no additional assembly is to be performed.

In a version, the at least one jaw comprises several jaws distributed about the axis of the threaded cylindrical surface. The actuation element is common to all the jaws.

Other features and advantages of the invention will become more apparent from the description hereinafter, with respect to non-limitative examples.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 1 is a partial axial cross-section of a bolted connection using a fastening device according to the invention;

FIG. 2 is a perspective view of a first embodiment of a nut according to the invention;

FIG. 3 is a perspective view of the body of the nut in FIG. 2, with its two jaws;

FIG. 4 is a partial perspective view of the nut in FIG. 2, with a partial cross-section of the actuation ring;

FIG. 5 is a half-view of the nut in cross-section perpendicular to the axis, in the release state;

FIG. 6 is a view similar to FIG. 5 but in the locking state;

FIG. 7 is a partial perspective view of a second embodiment of the invention;

FIG. 8 is a partial view of a third embodiment, in cross-section along two different axial planes;

FIG. 9 is a partial perspective view of a fourth embodiment of the nut according to the invention;

FIG. 10 is an exploded perspective view of the nut in FIG. 9;

FIG. 11 is an axial diagrammatic view illustrating the nut in FIG. 9 in the release state; and FIG. 12 is a view similar to FIG. 11 but illustrating the locking state.

DETAILED DESCRIPTION

The preceding and following descriptions are to be understood as containing not only the specific features and the specific combinations described, but any more or less generalized feature or combination of features, even drawn from one or more part(s) of a phrase or paragraph independently of the rest of the phrase or paragraph, providing such a feature or combination of features can confer a distinctive character on the invention and can make it possible for it to solve a problem posed with respect to the state of the art.

In the example shown in FIG. 1, two parts 1, 2, partially shown, are assembled in abutment against one another in a mating plane 3 by means of fasteners 4 (only one is shown) extending transversally to the mating plane 3. Each fastener 4 comprises a bolt 5 having a head 6 and a thread 7, and a nut 8 screwed onto the thread 7, which will be called "complementary thread". The nut 8 is equipped with locking means 9 which cooperate with the complementary thread 7 in proximity to the free end of the bolt 5. The reference 10 denotes the axis common to the bolt 5 and the nut 8. The bolt 5 is a standard bolt for this type of application; it does not include any specific means for locking the nut except optionally a small additional axial length. The structure and the production of the locking means 9 are thus constrained by the limited axial length available on the bolt.

In the example in FIGS. 2 to 6, the nut 8 equipped with locking means 9, comprises an annular body 11 having a threaded cylindrical internal surface 12 intended to threadingly engage the complementary thread 7 in FIG. 1. On its external perimeter, the body 11 has engagement conformations 13 for a tool for actuation in rotation during screwing and unscrewing (not shown).

The locking means 9 comprise two jaws 14 connected to the body 11 and having on their side 15 turned in use towards the complementary thread, a locking surface 16 configured and positioned to selectively come into frictional locking abutment on the complementary thread 7. The jaws 14 are distributed regularly about the axis 10 of the threaded cylindrical surface 12. The jaws 14 are capable of a locking state in which their locking surface 16 is in locking abutment against the complementary thread 7, which prevents the bolt 5 and the nut 8 from turning with respect to one another under the effect of the unwanted excitations such as vibrations, inertial effects, load reversals on the wheel, changing thermal stresses etc. The jaws 14 are also capable of a release state in which the pressure of the locking surfaces 16 on the complementary thread 7 is substantially withdrawn, which allows free rotation with respect to the bolt 5 and the nut 8.

According to the invention, each jaw 14 extends in a direction that is substantially circumferential with respect to the axis 10 of the cylindrical surface 12, between an attachment end 17 connected to the body 11 and an end 18 which is floating in a substantially radial direction. The jaws are identical to one another and all oriented in the same circumferential direction starting from their attachment end 17. In the example the attachment end 17 of each jaw is rigidly connected to the body 11 of the nut. More particularly, in this example, the jaw and the body come from a single piece of material, while being connected together at the attachment end 17 of the jaw, as shown in FIG. 3. The change of state of the jaw, between the release and locking states, is permitted by the flexural elasticity of the jaw itself, between its attachment end 17 and its floating end 18.

In the preferred example shown, the locking surfaces 16 belong to the threaded cylindrical surface 12. In the locking state, the locking surfaces 16 can thus perfectly match the complementary thread 7 without damaging it. In the release state, the locking surface 16 slides on the complementary thread in the same kinematic screwing and unscrewing relationship as the threaded cylindrical surface 12.

The locking means 9 also comprise an actuation element 19 that can be moved between locking and release positions, to selectively place the jaws 14 in the locking state of the relative screwing and unscrewing movement, and respectively in the release state of the relative screwing and unscrewing movement.

In the version shown, the actuation element is configured to exert, on an interaction area 21 of each jaw 14 provided on the side 20 of the jaw facing away from the locking surface 16, a force directed in use towards the complementary thread 7 to produce the locking state. The return of the jaws 14 to the release state takes place by elasticity. In the example, the release state is the rest state of the jaw 14. The elasticity ensuring the return of the jaw from the locking state to the release state is the flexural elasticity of the jaw.

At least in the locking state, the locking surface 16 of the jaw 14 is closer to the attachment end 17 of the jaw than the interaction area 21, as is clearly shown by observation of the right-hand jaw in FIG. 3. In the locking state, the jaw thus undergoes flexural strain between the locking surface 16 and the interaction area 21 (FIG. 6). There is thus an advantageous lever effect which reduces the force to be applied by the actuation element 19 on the jaw 14 for a desired urging force between the locking surface 16 and the complementary thread 7. Moreover, the area of flexural strain between the actuation element 19 and the locking surface 16 serves to limit pressure between the locking surface 16 and the complementary thread 7. The above-mentioned pressure limitation protects the entire fastening device against excessive forces which otherwise could be applied to the actuation element 19 due to poor manipulation.

In the example, the actuation element 19 is an actuation ring mounted in rotation with respect to the body 11 about the axis 10 of the threaded cylindrical surface 12. The actuation ring 19 is configured as a protective cover for the jaws 14. The jaws occupy an annular housing 22 the base of which is defined by the body 11, the perimeter by the peripheral wall 23 of the actuation ring 19, and the ceiling by an upper collar 24 of the actuation ring 19.

The actuation ring 19 and the jaws 14 interact by means of respective conjugate cam profiles 25, 26 and 27 (FIGS. 5 and 6).

In the example (see FIGS. 5 and 6), the cam profiles of the actuation ring include for each jaw 14 a boss 25. In the release position (FIG. 5), corresponding to the release state of the jaws, each boss 25 is opposite a groove 26 of the interaction area 21 of the respective one of the jaws 14. The jaws are thus permitted to adopt, by elastic recovery, their release state allowing screwing and unscrewing. In the locking position (FIG. 6), corresponding to the locking state of the jaws, the bosses 25 are in abutment against a boss 27 provided close to the floating end 18 of each jaw. The jaw is thus urged towards the complementary thread 7, so that the locking surface 16 of the jaw adopts a locking abutment position on the complementary thread 7.

The conjugate cam profiles 25, 26 and 27 define a hard point for movement of the actuation ring 19 between its locking and release positions. As shown in FIG. 6, the actuation ring only reaches its locking position when the internal boss 25 of the ring has slightly surpassed the apex of the boss 27 of the jaw 14. This stabilizes the locking state against vibrations and other mechanical disturbances.

In an embodiment, the device comprises stop means which limit the travel of the actuation element 19 between its locking and release positions. In the example in FIGS. 2 to 6, the actuationring 19 includes on its internal side wall overthicknesses 28 circumferentially intercalated between the jaws. The overthicknesses 28 butt against the floating ends 18 of the jaws in the release state and against the attachment ends 17 of the jaws 14 in the locking state. These overthicknesses prevent operating errors which would consist of displacing the actuation element 19 beyond one or other of its locking and release positions respectively.

As can be appreciated by observing FIG. 3, the body 11 and the jaws 14 can be produced from a single piece starting from a blank including the body 11 and a tapped axial tubular extension, then removal of material in the tubular extension to leave only the jaws 14 remaining, attached to the body 11 by a bridge of material 29. A milling 30 hollows out the internal face of the jaws in order to limit their locking face 16 to an area close to the attachment end 17 (FIGS. 3 and 4) as described above.

In a version, the actuation ring 19 has engagement means 31 (FIG. 2) for a rotation tool, that can be used to turn the actuation ring 19 with respect to the body 11 between the two angular positions of the actuation ring, namely the locking and release positions. In this example, the engagement means comprise two engagement conformations 31 in the form of notches formed facing away from the body 11.

In a version, the fastening device incorporates, in a single independent assembly, the body 11 with its threaded cylindrical surface 12, the at least one jaw 14 and the actuation element 19. To this end, the actuation ring 19 is axially immobilized with respect to the body 11, in a manner not shown in FIGS. 2 to 5, but examples of which will be given with reference to the following figures.

In a version, the actuation element 19 is permanently connected to the body 11 or in a manner forbidding disassembly except with a tool, so as to be unable to be lost in use, with respect to the body.

The direction of rotation of the actuation ring 19 from the release position to the locking position is advantageously the direction of screwing of the nut, so as to avoid the tendency for actuation of the ring to unscrew the nut, when passing to the locked state after screwing.

The embodiment in FIG. 7, which will only be described by its differences from that of FIGS. 2 to 6, includes interlock means for stabilizing the position of the actuation element 19 when it is not being actuated, and in particular to avoid the actuation element having a play visible through small movements when it is not being actuated in one direction or the other between its release and locking positions respectively.

To this end, the body 11 bears two stops 41 and a boss 42 placed halfway between the two stops 41. The actuation element 19 bears a tooth 43. In each of the locking and release positions respectively of the actuation element 19, the tooth 43 is immobilized between the boss 42 and a respective one of the stops 41. When the actuation element is displaced from one to the other of its above-mentioned positions, the tooth 43 elastically deflects to pass the boss 42, with a hard point effect, then to interlock between the boss 42 and the other stop 41.

When the interlock means are provided, the conjugate cam profiles 25, 26 and 27 (FIGS. 5 and 6) of the actuation ring 19 and of the jaws 14 no longer need to provide the hard point function. However, solid stops such as the overthicknesses 28 which prevent the operating errors liable to occur under a high force or torque are preferably kept.

In the embodiment shown, the tooth 43 is visible from the outside. Its position indicates the locking or release state respectively of the fastening device. The body 11 bears register marks 44, 45 which label the two possible positions.

The embodiment in FIG. 8, which will only be described by its differences with that in FIGS. 2 to 6, is an example for the axial immobilization of the actuation ring 19 with respect to the body 11. An open elastic retaining ring 46 is inserted into a peripheral slot 47 of the internal wall of the actuation ring 19. At the same time, the retaining ring is inserted into the void 48 between the body 11 and the jaws 14 (see right-hand part of FIG. 8). The attachment ends 17 of the jaws, which interrupt the void 48, include, opposite the slot 47, a slot 49 (left-hand part of FIG. 8) also receiving the retaining ring.

The retaining ring 46 is open and thus includes two ends 51. Preferably, the two ends 51 are located in a circumferential interval between the two jaws and shaped to come into abutment against the two jaws regarding circumferential movement, so that the retaining ring is substantially immobilized against rotations with respect to the body 11.

In the embodiment in FIGS. 9 to 12, which will only be described by its differences with the preceding embodiment, the retaining ring 46 is accommodated as before in a peripheral slot 47 of the internal face of the peripheral wall of the actuation ring 19. But this slot is now located facing a peripheral slot 52 formed in the jaws 14. The ends 51 of the retaining ring are now also projecting radially outwards in a recess 53 of the actuation ring 19. The circumferential dimension of the recess 53 thus limits the angular travel of the actuation ring 19 with respect to the body 11. The recess 53 includes at least one boss 54 that the engagement ends 51 can pass by elasticity of the retaining ring 46, this passing generating a hard point effect.

In the embodiment in FIG. 9, the outer periphery of the actuation ring 19 includes the same rotation engagement conformation profile 61 as those 13 of the body 11. It is ensured that in the release state, said engagement conformations correspond axially so as to be simultaneously engaged with the rotation tool.

In this embodiment, as shown in FIGS. 11 and 12, the cam profiles of the actuation ring 19 and of the jaw 14 belong to a respective ellipse centred on the axis 10. On the body 11, thus more specifically here on the jaws 14, the major axis of the ellipse passes substantially through the floating ends 18 of the jaws. The difference between the major axis and the minor axis of these ellipses is for example 1 mm. In FIG. 11 the major axes are superimposed, which makes it possible for the jaws to be in the release state. In FIG. 12 the minor axis of the actuation ring 19 was brought closer to the floating ends 18 located on the major axis, which compresses the jaws into the locking state.

In this embodiment, the locking is defined by a force applied to the jaws directly behind the locking surface. There is no longer a circumferential distance between the locking surface and the interaction area of the actuation ring and the jaw. The optimal force corresponds to a prescribed torque to be applied to the actuation ring 19. Owing to the bossed surface (bosses 54 in FIG. 9) against which the ends 51 of the retaining ring 46 move, the optimal angular position of the actuation ring in the locking state is stabilized whatever said position.

In this embodiment, the jaws can be thinner in the radial direction, which allows the actuation ring 19 to be radially thicker. This thickness facilitates the production of recesses 53 that be relatively deep and thus more effective for controlling movements of the actuation element 19.

Of course, the invention is not limited to the examples described and shown.

The features of the different embodiments can lead to other combinations.

For example, it is possible to use the retaining ring 46 in FIG. 9 in combination with a recess such as 53 but including only a single boss 54 separating, with hard point effect, a clearly determined angular locking position and angular release position, the whole in combination with jaws of the type of those in FIGS. 2 to 6, but actuated via conjugate cam profiles not necessarily producing a hard point effect.

The actuation element 19 of the embodiments in FIGS. 1 to 8 could include engagement conformations such as 61 in FIGS. 9 to 12, and conversely the actuation element 19 in FIGS. 9 to 12 could include engagement conformations

The invention claimed is:

1. A threaded fastening device, with locking in a screwed state, comprising:
a body having a threaded cylindrical surface configured to threadingly engage a complementary thread;
at least one jaw connected at least indirectly to the body and having a locking surface on a side facing the complementary thread in use;
the at least one jaw configured and positioned to come into locking abutment against the complementary thread;
the at least one jaw extending in a direction that is substantially circumferential with respect to an axially extending cylinder axis of the cylindrical surface, between an attachment end connected to the body, and an end which is floating in a substantially radial direction; and
an actuation element moveable between a locking position and a release position, to selectively place the jaw in a locking state in which the locking surface exerts a locking pressure on the complementary thread, and respectively in a release state wherein pressure of the locking surface on the complementary thread is substantially withdrawn;
wherein the actuation element comprises an actuation ring mounted in rotation with respect to the body about the axis of the threaded cylindrical surface.

2. The device of claim 1, wherein:
the actuation element is configured to exert on a side of the jaw facing away from the locking surface, a force directed in use towards the complementary thread; and the jaw is operable to return to the release state by elasticity of the jaw.

3. The device of claim 1, wherein the actuation element urges the jaw by bending to pass from the release state to the locking state.

4. The device of claim 1, wherein at least in the locking state, the locking surface of the jaw is closer to the attachment end of the jaw than an interaction area between the jaw and the actuation element, so as to cause the jaw to undergo flexural strain between the locking surface and the interaction area when the jaw is in the locking state.

5. The device of claim 1, wherein the attachment end of the jaw is rigidly connected to the body.

6. The device of claim 1, wherein the jaw and the body are made from a single piece of material, while being connected together at the attachment end of the jaw.

7. The device of claim 1, wherein the locking surface of the jaw is a part of the threaded cylindrical surface.

8. The device of claim 1, wherein the actuation element is permanently connected to the body or in a manner prohibiting disassembly except with a tool, so as to be unable to be separated from the body in use.

9. The device of claim 1, wherein the actuation ring is configured as a protective cover that protects the jaw.

10. The device of claim 1, wherein the actuation ring is held axially with respect to the body by a retaining ring.

11. The device of claim 10, wherein the retaining ring includes two ends shaped to come into abutment against the at least one jaw by circumferential movement, such that the retaining ring is substantially immobilized against rotation with respect to the body.

12. The device of claim 10, wherein the retaining ring is partially housed in a void arranged between the jaw and the body, and is thereby axially positioned with respect to the body.

13. The device of claim 1, wherein:
the retaining ring is immobilized against rotation with respect to one of the body or the actuation ring; and
the retaining ring includes at least one projection that cooperates with at least one recess provided in the other of the body or the actuation ring, so as to limit the angular travel of the actuation ring with respect to the body.

14. The device of claim 13 wherein the recess includes at least one boss that the projection can pass by elasticity of the retaining ring, thereby creating a detent effect.

15. The device of claim 1, wherein the actuation ring and the jaw comprise respective conjugate cam profiles engaging one another.

16. The device of claim 15, wherein the cam profile of at least one of the actuation ring or the jaw is at least part of a respective ellipse centered on the axis of the threaded cylindrical surface.

17. The device of claim 15, wherein the conjugate cam profiles define a detent for the movement of the actuation ring between the locking position and the release position.

18. The device of claim 1, wherein movement of the actuation element between the locking position and the release position passes by through at least one detent so as to stabilize the locked state of the jaw against mechanical excitations occurring in use.

19. The device of claim 1, further comprising an interlock system that stabilizes the actuation element in each of the locking position and the release position against adverse mechanical excitations.

20. The device of claim 19, wherein the interlock system comprises:
a boss disposed between two stops; and
a tooth displaceable between the two stops to positions on either side of the boss, by elastic deformation of the tooth, to thereby delimit travel of the actuation element with respect to the body with a detent effect.

21. The device of claim 1, further comprising stop means that limit travel of the actuation element during displacement into the locking and release positions.

22. The device of claim 21, wherein the stop means comprise at least one increased thickness of the actuation element protruding between two ends of the jaw.

23. The device of claim 1, further comprising means indicating the position of the actuation element.

24. The device of claim 1, wherein the fastening device is a nut.

25. The device of claim 24, wherein:
the body includes a tubular wall internally provided with the threaded cylindrical surface; and
the at least one jaw is at least partly defined by material removal from the tubular wall.

26. The device of claim 1, wherein the fastening device incorporates, in a single independent assembly, the body with its threaded cylindrical surface, the at least one jaw, and the actuation element.

27. The device of claim 1, wherein:
the at least one jaw comprises several jaws distributed about the axis of the threaded cylindrical surface; and
the actuation element is common to all of the jaws.

* * * * *